united States Patent Office 3,658,806
Patented Apr. 25, 1972

3,658,806
CIS-DIEQUATORIAL - 6 - (3,4 - DIHYDROXY OR METHYLENE DIOXY-PHENYL)-MORPHOLINE-2-PROPIONAMIDES AND ALPHA DERIVATIVES THEREOF
Rolf Denss, Karoly Kocsis, and Alex Meisels, Basel, Switzerland, assignors to Ciba-Geigy Corporation, Ardsley, N.Y.
No Drawing. Continuation-in-part of abandoned application Ser. No. 622,903, Mar. 14, 1967. This application Jan. 30, 1969, Ser. No. 795,349
Claims priority, application Switzerland, Mar. 16, 1966, 3,816/66
Int. Cl. C07d 87/42
U.S. Cl. 260—246 B
19 Claims

ABSTRACT OF THE DISCLOSURE 6-phenyl-2-morpholinepropionamide derivatives substituted in the phenyl radical by two hydroxyl groups or by a methylenedioxy group, and optionally substituted in the α-position of the propionamide moiety, are useful in the treatment of hypertension.

CROSS REFERENCE

This is a continuation-in-part of copending application Ser. No. 622,903, filed Mar. 14, 1967, now abandoned.

DETAILED DESCRIPTION

The present invention concerns new 6-phenyl-2-morpholinepropionamide derivatives, as well as new pharmaceutical preparations containing such substances and the use of these pharmaceutical preparations.

The invention provides in a first aspect, novel 6-phenyl-2-morpholinepropionamide derivatives of the formula:

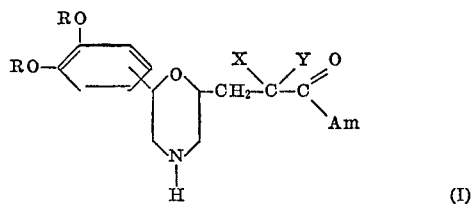

wherein each R is hydrogen or both R's taken together are methylene;
X is hydrogen, hydroxyl, amino, a lower alkanoyloxy, or lower alkanoylamino; and
Y is hydrogen; or
X and Y taken together are an oxygen atom and
Am is amino, mono-lower alkylamino, di-lower alkylamino, polymethyleneimino of from 5 to 8 ring members, or morpholino and their pharmaceutically acceptable acid addition salts.

The compounds of Formula I have valuable therapeutical properties, and affect in particular the cardiovascular system as hypotensively active substances. They are useful in particular in the treatment of hypertension in mammals. The hypotensive activity can be observed for example in standard and accepted models which are recognized by pharmacologists as correlating to a specific therapeutic response. Thus upon intravenous administration of from about 0.001 to about 10 mg./kg. of a compound of the invention, for example d,l-cis(diequat.)-6-(3,4-dihydroxyphenyl)-2-morpholine lactamide hydrochloride to the anesthetised cat, a reduction in the blood pressure of long duration is observed.

The compounds of Formula I and their acid addition salts also have a favorable therapeutic index.

In a second aspect, the invention provides pharmaceutical compositions comprising in unit dosage form a hypotensively effective amount of a compound according to the invention and a pharmaceutically acceptable carrier therefor.

In a third aspect, the invention provides a method for treating hypertension in mammals which comprises the administration to such mammals of a hypotensively effective dosage of a compound according to the invention or of a composition containing the same.

Furthermore, the invention provides novel compounds of the formula

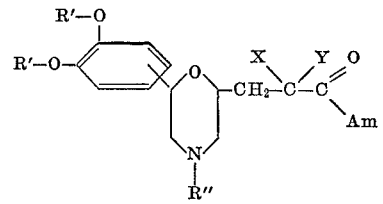

wherein each R' is an arylmethyl or diarylmethyl group or both (R')'s together are methylene;
R" is arylmethyl or diarylmethyl group; and
X, Y and Am have the meanings given in Formula I.

The compounds of Formula II are useful as intermediates in the production of the compounds of Formula I.

With greater particularity to the foregoing description, when Y is hydrogen, X can be a lower alkanoyloxy group such as acetoxy, propionoxy, butyroxy, isobutyroxy, valeroxy, isovaleroxy or pivaloyloxy group; or an alkanoylamino group such an acetamido, propionamido, butyramido and the like; as well as hydrogen, hydroxy, or amino. The group Am can be amino, monoalkylamino such as methylamino, ethylamino, n-propylamino, isopropylamino, n-butylamino, isobutylamino, sec. butylamino, tert. butylamino and the like; dialkylamino such as dimethylamino, ethylmethylamino, diethylamino, methylpropylamino, methylisopropylamino, di-n-propylamino, di-n-butylamino and the like; polymethyleneimino such as 1-pyrrolidinyl, piperidino, hexahydro-1H-azepin-1-yl, 2-methylpiperiidno, octahydro-1-azocinyl, 2,6 - dimethylpiperidino and the like; or morpholino.

A preferred class of compounds of particularly strong hypotensive action comprises the 6-phenyl-2-morpholinepropionamide derivatives of the formula

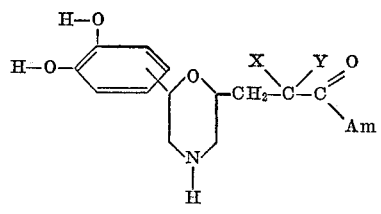

wherein

X is hydrogen, hydroxyl, amino, lower alkanoyloxy or loweralkanoylamino,
Y is hydrogen, and
Am represents the amino group, a lower alkylamino group or morpholino,
and their pharmaceutically acceptable acid addition salts.

Preferred members of this class are for example
the two diastereomeric d,l-cis(diequat.)-6-(3,4-dihydroxyphenyl)-2-morpholine lactamides, and the hydrochlorides thereof,
the two diasteromeric d,l-cis(diequat.)-α-acetoxy-6-(3,4-dihydroxyphenyl)-2-morpholine propionamides, and the hydrochlorides thereof,
the two diastereomeric d,l-cis(diequat.)-N-methyl-6-(3,4-dihydroxyphenyl)-2-morpholine alanine amides and the dihydrochlorides thereof,
the two diastereomeric d,l-cis(diequat.)-N-methyl-α-acetamido-6-(3,4-dihydroxyphenyl)-2-morpholine propionamides and the hydrochlorides thereof,
d,l-cis(diequat.)-6-(3,4-dihydroxyphenyl) - 2 - morpholine propionamide and the hydrochloride thereof, and
d,l-cis(diequat.)-6-(3,4-dihydroxyphenyl) - 2 - morpholine propiono morpholide and the hydrochloride thereof.

Also d,l-cis(diequat.)-α-acetoxy-6-(3,4-methylenedioxyphenyl)-2-morpholine propionamide shows good activity, which compound is diastereomeric, the hydrochloride of which has the melting point of 194–200°.

It is to be understood that whenever in this specification is referred to "2-morpholine propionic acid" derivatives, such as 2-morpholine propionic acid esters, propionamides, lactamides, or alanine amides, it is meant a structure in which the morpholine moiety is linked through its 2-position to the β-position of the propionic acid derivative. Furthermore, the substituent at the nitrogen of the amide nitrogen is designated as an "N-substituent," for example N-methyl, N,N-diethyl etc., whereas the substituent at the nitrogen of the morpholine ring is designated as the "4-substituents," for example 4-benzyl.

The hereinafter described ring closure reactions can lead in principle to the cis- and the trans-configurations as is apparent from the following sterical partial formulas:

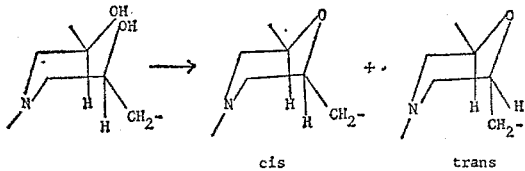

cis        trans

In general, the main product formed and the only product isolated is the cis isomer, both bulky groups being equatorial with respect to the plane of the morpholine ring.

This cis reaction product is isolated as a racemic mixture, designated "d,l-." The pertinent compounds are thus designated as "d,l-cis(diequat.)."

In compounds of Formula I wherein X is hydroxyl, amino, lower alkanoxyloxy or lower alkanoylamino, and Y is hydrogen, another asymmetric carbon atom is present. In these cases, four optically active enantiomers are possible, according to two racemic pairs each of which is diastereomeric to the other.

The compounds of Formula I can be prepared through hydrogenolysis of a compound of Formula II or an acid addition salt thereof, i.e. through treatment of a compound of Formula II with catalytically activated hydrogen until the amount of hydrogen required to split off the arylmethyl or diarylmethyl group present in the phenyl ring as R'', and optionally in the morpholine ring, as R', has been consumed. This hydrogenolysis is performed, for example, in the presence of a noble metal catalyst, such as palladium charcoal, or a nickel or nickel alloy catalyst in a suitable organic solvent such as ethanol, at room temperature and normal pressure. The morpholine derivative of Formula I thus obtained can then be converted to an addition salt with an inorganic or organic acid, in situ, if desired, by the addition of an equimolar amount or an excess of the acid desired as salt's anionic component, e.g., through the addition of hydrochloric acid.

The amides of Formula II can be produced, for example, from the appropriately substituted α-aminomethylbenzyl alcohols, e.g. 3,4-dibenzyloxy- 2,3-dibenzyloxy- or 3,4-methylenedioxy-α-aminomethylbenzyl alcohol. These α-aminomethylbenzyl alcohols are condensed with benzaldehyde and then reduced with sodium borohydride to yield the corresponding α-benzylaminomethylbenzyl alcohol. The substituted α-benzylaminomethylbenzyl alcohols are then allowed to react with an alkyl 4,5-epoxyvalerate or with a dialkyl acetal of 3,4-epoxybutyraldehyde to form correspondingly substituted 5-[N-benzyl-N-(β-hydroxyphenethyl)-amino]-4-hydroxyvaleric acid alkyl ester of 4-[N-benzyl-N-(β-hydroxyphenethyl)-amino]-3 - hydroxybutyraldehyde dialkyl acetal, respectively. The correspondingly substituted d,l-cis(diequat.) 4-benzyl-6-phenyl-2-morpholinepropionic acid alkyl esters or d,l-cis(diequat.) 4-benzyl-6-phenyl-2- morpholineacetaldehyde dialkyl acetals are then produced by ring closure, as through heating with p-toluenesulphonic acid in a lower alkanol, particularly ethanol, e.g. at reflux temperature, or by means of ethanolic hydrogen chloride at about 50°.

The d,l-cis(diequat.) 4-benzyl-6-phenyl-2-morpholinepropionates are then treated with ammonia or with an amine of the formula

$$Am\text{—}H \qquad (III)$$

wherein Am is as defined above, or alternatively are first converted to the corresponding acid chlorides or mixed anhydrides which are treated with ammonia or an amine of Formula III, thereby yielding compounds of Formula II wherein X and Y are hydrogen.

The d,l-cis(diequat.) 4-benzyl-6-substituted phenyl-2-morpholineacetaldehydes are liberated from their above-described lower dialkyl acetals as through treatment with sulphuric acid or p-toluenesulphonic acid in an aqueous alkanol and these aldehydes are in turn converted through reaction with sodium or potassium cyanide in acetic acid to the corresponding cyanohydrins, i.e., d,l-cis(diequat.) 4 - benzyl-6-substituted-phenyl-2-morpholine lactonitriles. Treatment of these cyanohydrins first with hydrogen chloride and ethanol or methanol and then with water yields the corresponding ethyl or methyl esters which, on reaction with ammonia or amines of Formula III yield amides of Formula II, wherein X is hydroxyl and Y is hydrogen. Those amides of Formula II, wherein X is a lower alkanoyloxy group and Y is hydrogen are obtained by alkanoylation whereas those wherein X and Y are an oxygen atom are obtained by oxidation, e.g. with manganese dioxide.

The above cyanohydrins can alternatively be reacted with ammonia in ethanol to yield correspondingly substituted d,l-cis(diequat.) α-amino-4-benzyl - 6 - phenyl-2-morpholinepropionitrile which in turn can be converted, in a fashion analogous to that described above for the lactonitriles, to the correspondingly substituted d,l-cis-(diequat.) 4-benzyl-6-phenyl-2-morpholinealanine lower alkyl esters. On reacting these with ammonia or amines of Formula III, amides of Formula II wherein X is amino and Y is hydrogen, are obtained. These can be alkanoylated to yield the compounds of Formula II wherein X is a lower alkanoyl and Y is hydrogen.

In the conversion of racemic d,l-cis(diequat.) 4-benzyl-6-phenyl-2-morpholineacetaldehydes to the corresponding cyanohydrines or to the α-amino-4-benzyl-6-phenyl-2-morpholine-propionitriles a new asymmetric center is introduced into the molecule giving rise to a mixture of two diastereomeric forms. These mixtures can be separated if desired into the diastereomers via conventional techniques, such as chromatography on silica gel. It is more practical, however, to transform the unseparated cyanohydrines or the d,1 - cis(diequat.) - α-amino-4-benzyl-6-phenyl-2-morpholine propionitriles into the corresponding lactic acid alkyl esters or the alanyl alkyl esters respectively and separate the latter into the diastereomers, e.g. by repeated column chromatography on from about 50 to about 100 times the amount of silica gel using ether, benzene or mixtures thereof or mixtures of benzene and a slight amount of ethanol as the eluant. The diastereomeric mixtures can also be separated in an analogous way at the amide stage, i.e. the compounds of Formula II, elution being performed with mixtures of benzene and a small amount of ethanol or of benzene, chloroform and a small amount of ethanol.

The purity of the diastereomers, i.e. the efficiency of the chromatographic procedure on columns, is controlled by thin layer chromatography on silica gel. The two diastereomers are, respectively, called the "upper," i.e. the faster moving, and the "lower," i.e. the slower moving, diastereomer.

When amides of Formula II, wherein X and Y together are an oxygen atom, are utilized, the center of asymmetry of the side chain thus having disappeared upon oxidation of the hydroxy group, separation is not necessary and advantageously all intermediate steps can be performed with diastereomeric mixtures. In the same way, it is possible to use diastereomeric mixtures, some of which crystallize, for all reactions, including the hydrogenolysis to form the end products of general Formula I.

If desired, the racemates obtained as compounds of Formula I in which X and Y can have any of the meanings given, can be separated into their optically active components in the usual way, e.g. by fractionated crystallisations of their addition salts with optically active organic acids; an intermediate product, however, can also be separated, e.g. the esters mentioned above or the amides of Formula II and further reactions can be performed with the optically active components. The optically active isomers, the racemic diastereomers and the mixture of the diastereomeric forms are all included within the scope of the present invention.

Alternatively, compounds of Formula I wherein both R's are methylene, X is hydrogen, hydroxyl or amino (X') and Y is hydrogen can be obtained from a compound of the formula

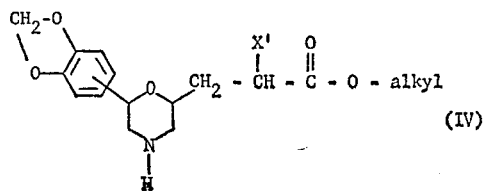

(IV)

via treatment with an excess of an amine of Formula III, optionally in a solvent such as methanol, ethanol, benzene, toluene or the like. The reaction is executed at a temperature of from about 0° to about 150°, in a closed vessel if necessary.

If desired, a compound of Formula I as the free base can be converted in the usual way into its addition salts with inorganic and organic acids, this being done when the product of the hydrogenolysis is not isolated as the salt of the inorganic or organic acid. For example the acid desired as salt component or a solution thereof is added to a solution of a compound of Formula I as the free base in an organic solvent such as methanol, ethanol or ether and the precipitated salt is then isolated via conventional techniques. Such acid addition salts which are pharmaceutically acceptable can be used as medicaments instead of the free bases since the salts crystallise well and are not or are only slightly hygroscopic. Hydrochloric acid, hydrobromic acid, sulphuric acid, phosphoric acid, methanesulphonic acid, 1,2-ethane disulphonic acid, β-hydroxyethanesulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid, for example, can be used for salt formation with the compounds of general Formula I.

The new compounds of general Formula I are administered orally, rectally or parenterally. The daily dosages of the free bases or of pharmaceutically acceptable salts thereof vary from about 0.001 to about 0.1 mg./kg. of body weight, e.g., from about 0.1 to about 10 mg. for an adult patient. Suitable unit dosage forms such as dragées, tablets, suppositories or ampoules, preferably contain 0.05–5 mg. of a compound of Formula I or a pharmaceutically acceptable salt thereof. Also forms designed not to deliver single unit dosages, but rather a predetermined quantity of material in association with and per unit volume of a diluent such as drops, syrups, sprays or aerosols, can be employed.

Dosage units for oral administration preferably contain between 1–80% of a compound of Formula I or a pharmaceutically acceptable salt of such as an active substance. They are produced by combining the active substance with solid, pulverulent carriers such as lactose, saccharose, sorbitol, mannitol; starches such as potato starch, maize starch or amylopectin; cellulose derivatives of gelatin, optionally with the addition of lubricants such as magnesium or calcium stearate or polyethylene glycols of suitable molecular weights, to form tablets or dragée cores. The latter are coated with, for example, concentrated sugar solutions which can also contain gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Other suitable dosage units for oral administration include hard gelatin capsules and soft closed capsules made of gelatin and a softener as glycerin. The former advantageously contain a compound of Formula I in the form of granulate optionally in admixture with diluents such as maize starch, and lubricants such as talcum or magnesium stearate and, optionally stabilizing agents such as sodium metabisulphite or ascorbic acid. In soft capsules an amide of Formula I is preferably dissolved or suspended in suitable liquids such as liquid polyethylene glycols, to which stabilizing agents can also be added.

Examples of dosage units for rectal administration include suppositories which consist of a combination of a compound of Formua I, or a suitable salt thereof, with a neutral fatty foundation, or gelatin rectal capsules containing a combination of the active substance and polyethylene glycols of suitable molecular weight.

Ampoules for parenteral, particularly intramuscular administration, preferably contain a water soluble acid addition salt of a compound of Formula I in a concentration of from about 0.5 to about 10% in aqueous solution, optionally including suitable stabilizing agents and buffers.

The following illustrates the production of tablets:

One-tenth of a gram of d,l-cis(diequat.)-6-(3,4-dihydroxyphenyl) - 2 - morpholinelactamide hydrochloride is homogeneously mixed with 80.00 g. of lactose, 31.00 g. of colloidal silicon dioxide and the mixture is evenly moistened with a dispersion of 5.00 g. of gelatin, 1.40 g. of colloidal silicon dioxide and 1.00 g. of glycerol in about 50 ml. of distilled water. The moistened mass is granulated through sieve III (1.2 mm. space between meshes, 25 meshes to 1 sq. cm.). The granulate is dried for about 12 hours at 40–50°, passed through sieve III–IIIa (0.75 mm. space between meshes, 49–64 meshes per sq. cm.), and mixed well with 9.00 g. of maize starch, 1.00 g. of colloidal silicon dioxide, 6.00 g. of talcum and 0.50 g. of magnesium stearate. This mixture is pressed into 1,000 tablets. Each tablet weighs 0.140 g. and contains 0.10 mg. of active substance (hydrochloride). The tablets are suitable for the treatment of hypertension of various origin.

The following examples further illustrate the invention but are not intended as limiting the scope thereof in any way. In this specification and the appended claims, temperature is given in degrees centigrade, and percentages are given by weight unless expressly stated otherwise. Solvent ratios are given in parts by volume.

EXAMPLE 1

(i) A solution of 1.47 g. of d,l-cis(diequat.)-N-methyl-4-benzyl-6-(3,4-dibenzyloxyphenyl) - 2 - morpholine propionamide in 150 ml. of 96% ethanol is shaken at room temperature under an atmosphere of hydrogen with 1.0 g. of 10% palladium charcoal and 2.0 ml. of ethanolic hydrogen chloride solution (containing 13% hydrogen chloride in 96% ethanol). After about 2 hours the hydrogen uptake is stopped. The catalyst is filtered off and washed with ethanol and the filtrate is concentrated in vacuo at 40–50°. On cooling and mixing with a mixture of ethanol/isopropanol/ether, the oily hydrochloride solidifies. After recrystallisation from ethanol/ether, the d,l-cis(diequat.) - N - methyl - 6 - (3,4 - dihydroxyphenyl)-2-morpholine propionamide hydrochloride hydrate is obtained; it melts at 113–118° with decomposition.

The starting material used in this example is produced as follows:

(a) 35 ml. of freshly distilled benzaldehyde are added to a solution of 100.0 g. of α-aminomethyl-3,4-dibenzyloxy-benzyl alcohol in 800 ml. of benzene and the whole is refluxed while separating off water. After about 3 hours the theoretical amount of water has been removed. The solution is then concentrated to about 400 ml., n-hexane is added until it becomes opaque and then it is cooled whereupon the crystalline product precipitates. After recrystallisation from benzene/n-hexane, the 3,4-dibenzyloxy - α - (benzylideneaminomethyl)-benzyl alcohol is obtained, M.P. 93–95°.

(b) 60.0 g. of 3,4-dibenzyloxy-α-(benzylideneaminomethyl)-benzyl alcohol are slurried in 500 ml. of isopropanol and, at room temperature, a solution of 50.0 g. of sodium borohydride in 450 ml. of ice cold methanol is added dropwise within 30 minutes while stirring. The reaction mixture is then refluxed for 4 hours whereupon the substance dissolved. The reaction mixture is then cooled, evaporated to dryness in vacuo at 50°, the solid residue is mixed with 800 ml. of water and extracted several times with cloroform. The combined chloroform extracts are washed with water, dried over sodium sulphate and the solvent is distilled off in vacuo at 40°. After recrystallisation of the remaining product from benzene/n-hexane, the 3,4-dibenzyloxy-α-(benzylaminomethyl)-benzyl alcohol melts at 107–109°.

(c) 40.0 g. of 3,4-dibenzyloxy-α-(benzylaminomethyl) benzyl alcohol and 20.0 g. of ethyl 4,5-epoxyvalerate (B.P. 96–97°/20 torr, produced by epoxydating ethyl allylacetate with perbenzoic acid in chloroform in the dark at 0°), are refluxed under a nitrogen atmosphere for 14 hours in 250 ml. of anhydrous ethanol. After evaporating off the ethanol in vacuo at 60°, the oily ethyl 5-[N-benzyl - N - (3,4-dibenzyloxy-β-hydroxyphenethyl) amino]-4-hydroxy-valerate remains.

(d) About 60 g. of the above ester are dissolved in 100 ml. of anhydrous ethanol, then a solution of 45.0 g. of p-toluene sulphonic acid hydrate in 150 ml. of anhydrous ethanol is added and the whole is refluxed under an atmosphere of nitrogen for 18 hours. The ethanol is then evaporated off in vacuo at 45–50°, the oil which remains is poured into water, the mixture is made alkaline with solid sodium carbonate and extracted several times with ether. The combined ether extracts are washed with water, dried over sodium sulphate, the ether is evaporated off and the oily mixture is separated by chromatographing three times on 20 times the amount of silica gel using a mixture of benzene/chloroform/acetone (5:5:0.25) as eluent. After recrystallisation from methylene chloride/ether, the ethyl d,l-cis(diequat.)-4-benzyl-6-(3,4-dibenzyloxyphenyl)-2-morpholine propionate is obtained; it melts at 91–92°.

(e) 2.44 g. of ethyl d,l-cis(diequat.)-4-benzyl-6-(3,4-dibenzyloxyphenyl)-2-morpholine propionate are dissolved in 10 ml. of benzene, 150 ml. of methylamine solution (33% methylamine in anhydrous ethanol) are added and the clear solution is left to stand in a closed flask for 4 days at room temperature. The reaction mixture is evaporated to dryness in vacuo at 50° and the solid residue is chromatographed on 80 times the amount of silica gel using a mixture of benzene/ethanol (92:8) as eluent. After recrystallisation from a mixture of ethyl acetate/ether (1:1), the d,l-cis(diequat.) - N - methyl-4-benzyl-6-(3,4-dibenzyloxyphenyl)-2-morpholine propionamide is obtained; it melts at 127–129°.

EXAMPLE 2

(i) A solution (0.640) g. of d,l-cis(diequat.)-4-benzyl-6-(3,4-dibenxyloxyphenyl)-2-morpholine lactamide (M.P. 129–130°) in 40 ml. of 96% ethanol is shaken at room temperature under an atmosphere of hydrogen with 0.60 g. of 10% palladium charcoal and 0.70 ml. of ethanolic hydrogen chloride solution (containing in said 0.70 ml. 100 mg. of HCl in aqueous ethanol of 96% $C_2H_5OH$ content; corresponding to about 2 mols per mol of amide).

No more hydrogen is taken up after about 3 hours. The catalyst is then filtered off and washed with ethanol, and the filtrate is concentrated in vacuo at 35–40°. On cooling and mixing with ether, the oily hydrochloride solidifies into an amorphous powder. After recrystallisation from ethanol/ether, the d,l-cis(diequat.)-6-(3,4-dihydroxyphenyl)-2-morpholine lactamide hydrochloride is obtained; the melting point of which is at 208–210° (with decomposition).

The starting material used in this example is produced as follows:

(a) 24.0 g. of 3,4-dibenzyloxy-α-(benzylaminomethyl) benzyl alcohol (produced as in Example 1(b)) and 12.0 g. of 1,1-diethoxy-3,4-epoxybutane in 200 ml. of anhydrous ethanol are refluxed for 14 hours under an atmosphere of nitrogen. After evaporating off the ethanol in vacuo at 60°, the oily 4-[N-benzyl-N-(3,4-dibenzyloxy-β-hydroxyphenethyl)-amino]-3-hydroxy-butyraldehyde diethyl acetal remains.

(b) 35.5 g. of the above acetal are dissolved in 100 ml. of anhydrous ethanol, a solution of 22.0 g. of p-toluene sulphonic acid hydrate in 200 ml. of anhydrous ethanol is added and the whole is refluxed for 14 hours under an atmosphere of nitrogen. The reaction mixture is worked up as described in Example 1(d) and the oil which remains is separated by chromatographing twice on 40 times the amount of silica gel each time using a mixture of benzene/chloroform/ethyl acetate (6:6:2.5) as eluent. After recrystallisation from pentane, the d,l-cis(diequat.)-4-benzyl-6-(3,4 - dibenzyloxyphenyl)-2-morpholine acetaldehyde diethyl acetal melts at 58–60°.

(c) 40.0 g. of d,l-cis(diequat.) - 4 - benzyl-6-(3,4-dibenzyloxyphenyl) - 2 - morpholine acetaldehyde diethyl acetal are dissolved in 300 ml. of n-butanol. A solution of 15.0 ml. of concentrated sulphuric acid in 300 ml. of water is added dropwise within 15 minutes, the addition being made while stirring vigorously and cooling with an ice bath, whereupon two phases are formed. The reaction mixture is then refluxed for 10 minutes under an atmosphere of nitrogen, then cooled, poured into water, made alkaline with solid sodium carbonate and extracted several times with ether. The combined ether extracts are washed with water, dried over sodium sulphate, the solvent is evaporated off in vacuo at 70° and the oil which remains is separated by chromatographing on 30 times the amount of silica gel using a mixture of benzene/chloroform/ethyl acetate (6:6:2.5) as eluent. After recrystallisation from a mixture of benzene/ether, the d,l-cis(diequat.)-4-benzyl- 6-(3,4 - dibenzyloxyphenyl)-2-morpholine acetaldehyde melts at 124–125°.

(d) 9.0 g. of d,l-cis(diequat.)-4-benzyl-6-(3,4-dibenzyloxyphenyl)-2-morpholine acetaldehyde are dissolved in a mixture of 80 ml. of glacial acetic acid, 40 ml. of ethanol and 40 ml. of water and, while stirring and cooling with an ice bath, 9.60 g. of solid potassium cyanide are added in portions within 30 minutes, after which the clear solution is left to stand for 14 hours at room temperature. Another 4.0 g. of solid potassium cyanide are then added to the reaction mixture, the whole is refluxed for 1 hour under an atmosphere of nitrogen and then cooled, poured into water, made alkaline with solid sodium carbonate and extracted several times with ether. The combined ether extracts are washed with sodium carbonate solution and water, and dried over sodium sulphate. After evaporating off the solvent in vacuo at 40–45°, the oily mixture of two diastereomeric d,l-cis(diequat.)-4-benzyl-6-(3,4-dibenzyloxyphenyl) - 2 - morpholine acetaldehyde cyanohydrins remains.

(e) 8.0 g. of the above mixture of cyanohydrins is dissolved in 45 ml. of chloroform, 9.0 ml. of a solution of hydrogen chloride in chloroform/ethanol (100 g. of dry hydrogen chloride in 500 ml. of anhydrous ethanol/chloroform (1:1)) are added and the solution is left to stand in a closed flask under an atmosphere of nitrogen for 2½ days at 0°. The solvent is then evaporated off in vacuo at 35–40°, the oil which remains is taken up in a mixture of 20 ml. of water and 40 ml. of ethanol and the clear solution is kept on a water bath for 15 minutes at 50–55°. The solution is then cooled, poured into water and worked up as described in Example 1(d). The oily mixture of the diastereomeric esters (6.0 g.) is separated by repeated chromatography on 100 times the amount of silica gel using a mixture of ether/benzene (3:2) as eluent. The two diastereomeric d,l-cis(diequat.)-4-benzyl-6-(3,4-dibenzyloxyphenyl)-2-morpholine lactic acid ethyl esters melting at 90–92° and 106–108° are obtained (recrystallised from methylene chloride/ether).

(f) 0.55 g. of d,l-cis(diequat.)-4-benzyl-6-(3,4-dibenzyloxyphenyl)-2-morpholine lactic acid ethyl ester, M.P. 90–92°, are dissolved in 3.0 ml. of benzene, then 6.0 ml. of ethanolic ammonia (15% ammonia in ethanol) and 5.0 ml. of concentrated aqueous ammonium hydroxide solution and then more ethanolic ammonia until a clear solution is attained (about 9 ml.) are added whereupon the whole is left to stand in a closed flask at room temperature. After 24 hours, another 5.0 ml. of concentrated aqueous ammonium hydroxide solution are added to the reaction mixture. After, in all, 2½ days' standing, the solution is evaporated to dryness in vacuo at 45–50° and the oil which remains is chromatographed on 100 times the amount of silica gel using a mixture of benzene/ethanol (20:1) as eluent. After recrystallisation from methylene chloride/ether, d,l-cis(diequat.) - 4 - benzyl-6 - (3,4-dibenzyloxy-phenyl)-2-morpholine lactamide diastereomer is obtained which has its melting point at 129–130°.

The starting material for this example can also be produced as follows:

(a') 70 ml. of freshly distilled benzaldehyde are added to a solution of 100.0 g. of α-aminomethyl-3,4-dibenzyloxy-benzyl alcohol in 800 ml. of benzene and the whole is refluxed while separating off water. The theoretical amount of water has been removed after about 6 hours. The solution is then concentrated to 400 ml., n-hexane is added until it becomes opaque and then it is cooled whereupon the crystalline product precipitates. After recrystallisation from benzene/n-hexane, 3,4-dibenzyloxy-α-(benzylideneaminomethyl)-benzyl alcohol is obtained, M.P. 93–95°.

(b') 50.0 g. of 3,4-dibenzyloxy-α-(benzylideneaminomethyl)-benzyl alcohol are slurried in 400 ml. of isopropanol, a solution of 45.0 g. of sodium borohydride in 400 ml. of ice cold methanol is added dropwise within 20 minutes at room temperature while stirring and then the reaction mixture is refluxed for 4 hours, whereupon the substance dissolves. The reaction mixture is then cooled, concentrated in vacuo at 40–45° to dryness, the solid residue is mixed with 800 ml. of water and extracted several times with benzene. The combined benzene extracts are washed with water, dried over sodium sulphate and the solvent is evaporated off in vacuo at 40°. After recrystallisation of the residue from benzene/n-hexane, 3,4 - dibenzyloxy-α-(benzylaminomethyl)-benzyl alcohol is obtained, M.P. 107–109°.

(c') 24.0 g. of 3,4-dibenzyloxy-α-(benzylaminomethyl)-benzyl alcohol and 12.0 g. of 1,1 - diethoxy-3,4-epoxybutane in 200 ml. of abs. ethanol are refluxed for 14 hours under an atmosphere of nitrogen. After evaporation of the ethanol in vacuo at 60°, the oily 4-[benzyl-N-(3,4-dibenzyloxy - β - hydroxyphenyl) - amino]-3-hydroxybutyraldehyde diethyl acetal remains.

(d') The above acetal (35.5 g.) is dissolved in 100 ml. of abs. ethanol, a solution of 22.0 g. of p-toluene sulphonic acid hydrate in 200 ml. of abs. ethanol is added and the whole is refluxed for 14 hours under an atmosphere of nitrogen. The reaction mixture is then concentrated in vacuo at 40°, the oil which remains is poured into water, the mixture is made alkaline with solid sodium carbonate and it is extracted several times with ether. The combined ether extracts are washed with water, dried over sodium sulphate, the ether is evaporated off and the oily mixture is separated by chromatographing twice on 40 times the amount of silica gel each time with a mixture of benzene/chloroform/ethyl acetate (6:6:2.5) as eluent. After recrystallising from pentane, the d,l-cis(diequat.) - 4 - benzyl - 6-(3,4-dibenzyloxyphenyl)-2-morpholine acetaldehyde diethyl acetal melts at 58–60°.

(e') 9.0 g. of d,l-cis(diequat.) - 4 - benzyl-6-(3,4-dibenzyloxyphenyl) - 2-morpholine acetaldehyde diethyl acetal are dissolved in 100 ml. of n-butanol. A solution of 3.2 ml. of concentrated sulphuric acid in 90 ml. of water is then added dropwise within 15 minutes while stirring vigorously and cooling with an ice bath. Two phases are formed. The reaction mixture is then refluxed for 30 minutes under an atmosphere of nitrogen, then cooled, poured into water, made alkaline with solid sodium carbonate and extracted several times with ether. The combined ether extracts are washed with water, dried over sodium sulphate and the solvent is evaporated off in vacuo at 40°. The oily d,l-cis(diequat.)-4-benzyl-6-(3,4-dibenzyloxyphenyl)-2-morpholine acetaldehyde is purified by chromatographing on 30 times the amount of silica gel with a mixture of benzene/ether (9:1) as eluent.

(f') 9.0 g. of d,l-cis(diequat.)-4-benzyl-6-(3,4-dibenzyloxyphenyl)-2-morpholine acetaldehyde are dissolved in a mixture of 80 ml. of glacial acetic acid, 40 ml. of ethanol and 40 ml. of water. In a closed vessel, 9.6 g. of solid potassium cyanide are added in portions within 30 minutes while stirring and cooling with an ice bath. The clear solution is then left to stand for 14 hours at room temperature. Another 2.0 g. of solid potassium cyanide are then added to the reaction mixture which is then refluxed for 1 hour under an atmosphere of nitrogen, then cooled, poured into water and worked up as described in Example 2(e). After evaporation of the solvent, the oily mixture of the diastereoisomeric d,l-cis(diequat.)-4-benzyl-6-(3,4-dibenzyloxyphenyl) - 2-morpholine acetaldehyde cyanohydrins remains.

(g') The above mixture of cyanohydrins (8.0 g.) is dissolved in 45 ml. of chloroform, 9 ml. of a solution of hydrogen chloride in chloroform/ethanol (100 g. of dry hydrogen chloride in 500 ml. of abs. ethanol/chloroform (1:1)) are added and the solution is left to stand under an atmosphere of nitrogen for 2.5 days at 0°. The solvent is then evaporated off in vacuo at 35–40°, the oily residue is taken up in a mixture of 50 ml. of water and 100 ml. of ethanol and the clear solution is heated on a water bath for 10 minutes at 50°. The solution is then cooled, poured into water and worked up as described in Example 2e). The mixture obtained of diastereoisomeric esters (6.0 g.) is dissolved in ether and separated by repeated chromatography on 100 times the amount of silica gel with a mixture of ether/benzene (3:2) as eluent. The pure racemate of the one cis(diequat.) - 4 - benzyl-6-(3,4-dibenzyloxyphenyl)-2-morpholine lactic acid ethyl ester is obtained. M.P. 90–92° (from ether).

(h') 0.550 g. of d,l-cis(diequat.) - 4-benzyl-6-(3,4-dibenzyloxyphenyl)-2-morpholine lactic acid ethyl ester are dissolved in 3 ml. of benzene, 6 ml. of ethanolic ammonia (15% ammonia in ethanol), 5 ml. of concentrated aqueous ammonium hydroxide solution are added and then more ethanolic ammonia is added until a clear solution is obtained (about 9 ml.), whereupon the whole is left to stand in a closed flask at room temperature. After 24 hours, another 5 ml. of concentrated aqueous ammonium hydroxyide solution are added. After standing for, in all, 2.5 days, the solution is evaporated to dryness in vacuo at 40–45° and the oil which remains is chromatographed in 100 times the amount of silica gel with a mixture of benzene/ethanol (20:1) as eluent. After recrystallisation from methylene chloride/ether, the d,l-cis(diequat.)-4-benzyl - 6 - (3,4-dibenzyloxyphenyl)-2-morpholine lactamide melts at 129–130°.

EXAMPLE 3

A solution (0.70 g.) of d,l-cis(diequat.) - 4-benzyl-6-(3,4-dibenzyloxyphenyl)-2-morpholine lactamide (M.P. 161–163°) in 40 ml. of 96% ethanol is shaken at room temperature under an atmosphere of hydrogen with 1.0 g. of 10% palladium charcoal and 1.30 ml. of ethanolic hydrochloride solution (containing 20% hydrogen chloride in anhydrous ethanol). No more hydrogen is taken up after about 5 hours. The reaction mixture is then worked up as described in Example 2. After recrystallisation from a mixture of ethanol/isopropanol, a diastereomeric d,l-cis(diequat.) - 6-(3,4-dihydroxyphenyl)-2-morpholine lactamide hydrochloride is obtained which melts at 142–146° (with decomposition).

The starting material used in this example, the d,l-cis-(diequat.) - 4 - benzyl - 6 - (3,4-dibenzyloxyphenyl)-2-morpholine lactamide, M.P. 161–163°, is prepared from the d,l-cis(diequat.) - 4 - benzyl - 6 - (3,4-dibenzyloxyphenyl)-2-morpholine lactic acid ethyl ester, M.P. 106–108° (separated as in Example 2(e)), analogously to Example 2(f).

EXAMPLE 4

A solution of 0.350 g. of d,l-cis(diequat.)-4-benzyl-6-(3,4-dibenzyloxyphenyl) - 2 - morpholine pyruvic acid amide in 80 ml. of 96% ethanol is shaken at room temperature under an atmosphere of hydrogen with 0.60 g. of 10% palladium charcoal and 0.80 ml. of ethanolic hydrogen chloride solution (as in Example 1). No more hydrogen is taken up after about 4 hours. The reaction mixture is then worked up as described in Example 1. After recrystallisation from a mixture of methanol/ethanol/ether, the d,l-cis(diequat.)-6-(3,4-dihydroxyphenyl)-2-morpholine pyruvic acid amide hydrochloride melts at 158–163° with decomposition.

The starting material used in this example is produced as follows:

2.50 g. of a mixture of diastereomeric d,l-cis(diequat.)-4-benzyl - 6 - (3,4 - dibenzyloxyphenyl) - 2 - morpholine lactamides (prepared as in Example 2(f)) from the mixture of diastereomeric d,l-cis(diequat.)-4-benzyl-6-(3,4-dibenzylovyphenyl) - 2 - morpholine lactic acid ethyl esters (Example 2(e)) are dissolved in 150 ml. of acetonitrile, then 5.0 g. of activated manganese dioxide (prepared according to Attenburrow et al.; Soc. 1952, 1094) are added and the whole is refluxed for 18 hours while stirring. The warm reaction mixture is then filtered under suction through a filter auxiliary, e.g. Hyflo, and the filter residue is washed several times with warm acetonitrile. The acetonitrile solutions are combined, then evaporated to dryness in vacuo at 50° and the solid mixture which remains is separated by chromatographing on 100 times the amount of silica gel using a mixture of benzene/chloroform/ethanol (5:5:0.3) as eluent. After recrystallisation from hot benzene and then from methylene chloride/ether, the d,l-cis(diequat.)-4-benzyl - 6 - (3,4-dibenzyloxyphenyl)-2-morpholine pyruvic acid amide melts at 152–153° with decomposition.

EXAMPLE 5

(i) A solution (0.80 g.) of d,l-cis(diequat.)-N-methyl-4-benzyl-6-(3,4-dibenzyloxyphenyl)-2-morpholine alanine amide, M.P. 123–124°, in 50 ml. of 96% ethanol is shaken at room temperature under an atmosphere of hydrogen with 1.30 g. of 10% palladium charcoal and 2.0 ml. of ethanolic hydrogen chloride solution (as in Example 3). After the hydrogen uptake has slowed down, another 0.50 g. of 10% palladium charcoal and 1.0 ml. of ethanolic hydrogen chloride solution are added to the reaction mixture. After about 6.5 hours, no more hydrogen is taken up. Then the reaction mixture is worked up as in Example 1. After recrystallisation from a mixture of methanol/ethanol/ether, the diastereomeric d,l-cis(diequat.)-N-methyl-6-(3,4-dihydroxyphenyl) - 2 - morpholine alanine amide dihydrochloride monohydrate melts at 193–198° (with decomposition).

The starting material used in this example is produced as follows:

(a) The oily mixture (10.73 g.) of diastereomeric d,l-cis(diequat.)-4-benzyl - 6 - (3,4 - dibenzyloxyphenyl)-2-morpholine acetaldehyde cyanohydrins (prepared as in Example 2(d)) is dissolved in 25 ml. of 96% ethanol. 250 ml. of ethanolic ammonia (15% ammonia in ethanol) are then added and the clear solution is left to stand for 4 days at room temperature in a closed flask. The solvent is then evaporated to dryness in vacuo at 50° whereupon the oily mixture of the two diastereomeric d,l-cis(diequat.)-α-amino - 4 - benzyl - 6 - (3,4-dibenzyloxyphenyl)-2-morpholine propionitriles remains.

(b) The above mixture of the diasteromeric nitriles (10.0 g.) is dissolved in 50 ml. of chloroform, 16.0 ml. of a solution of hydrogen chloride in chloroform/ethanol (as in Example 2(e)) are added and the clear solution is left to stand in a closed flask for 6 days at 0°. The reaction mixture is then worked up as in Example 2(e). After evaporating off the solvent, the oil which remains is separated by chromatographing twice on 50 times and 100 times the amount of silica gel using a mixture of benzene/ethanol (20:1) as eluent. Both diastereomeric d,l-cis(di-equat.)-4-benzyl - 6 - (3,4-dibenzyloxyphenyl)-2-morpholine alanine ethyl esters are oily. They are distinguished by thin layer chromatograms on silica gel and benzol+10% ethanol as eluent.

(c) 2.0 g. of one of the diastereomeric d,l-cis(diequat.)-4-benzyl-6-(3,4-dibenzyloxyphenyl) - 2 - morpholine alanine ethyl (the "upper" product on thin layer chromatogram) are dissolved in 20 ml. of ethanolic methylamine (as in Example 1(e)) and the clear solution is left to stand in a closed flask for 2 days at room temperature. The solution is then evaporated to dryness in vacuo and 50° and the amide which remains is purified by chromatographing on 35 times the amount of silical gel using a mixture of benzene/ethanol (9:1) as eluent. After recrystallisation from methylene chloride/ether, a diastereomeric d,l-cis(diequat.)-N-methyl - 4 - benzyl-6-(3,4-dibenzyloxyphenyl)-2-morpholine alanine amide is obtained, which melts at 123–124°.

EXAMPLE 6

A solution (0.65 g.) of d,l-cis(diequat.)-N-methyl-4-benzyl-6-(3,4-dibenzyloxyphenyl) - 2 - morpholine alanine amide, M.P. 118–123°, in 40 ml. of 96% ethanol is shaken at room temperature under an atmosphere of hydrogen with 1.0 g. of 10% palladium charcoal and 2.0 ml. of ethanolic hydrogen chloride solution (as in Example 3). After about 27 hours, no more hydrogen is taken up. The reaction mixture is then worked up as in Example 1. After recrystallisation from a mixture of methanol/ethanol, the second diastereomeric d,l-cis(diequat.) - N - methyl - 6 - (3,4-dihydroxyphenyl)-2-morpholine alanine amide dihydrochloride monohydrate is obtained, which melts at 194–200° (with decomposition).

The starting material used in this example is produced as follows:

1.44 g. of the second diastereomeric d,l-cis(diequat.)-4-benzyl - 6 - (3,4-dibenzyloxyphenyl) - 2 - morpholine alanine ethyl (the "lower" product in thin layer chromatogram) (separated in Example 5(b)) are dissolved in 15 ml. of 96% ethanol. 35 ml. of ethanolic methylamine (as in Example 1(e)) are then added and the clear solution is left to stand in a closed flask for 2 days at room temperature. The reaction mixture is then worked up as in Example 5(c) and the amide is purified by chromatographing on 50 times the amount of silica gel using a mixture of benzene/ethanol (9:1) as eluent. After recrystallisation from methylene chloride/ether, the second diastereomeric d,l-cis(diequat.) - N - methyl - 4 - benzyl-6-(3,4-dibenzyloxyphenyl) - 2 - morpholine alanine amide melts at 118–123°.

EXAMPLE 7

A solution (0.680 g.) of d,l-cis(diequat.)-4-benzyl-6-(3,4-methylenedioxyphenyl) - 2 - morpholine lactamide, M.P. 198–200°, in 40 ml. of 96% ethanol is shaken at room temperature under an atmosphere of hydrogen with 0.350 g. of 10% palladium charcoal and 1.0 ml. of ethanolic hydrogen chloride solution (as in Example 3). After the uptake of about 35% of the theoretical amount of hydrogen, another 0.350 g. of 10% palladium charcoal is added to the reaction mixture. After about 5 hours, no more hydrogen is taken up. The reaction mixture is then worked up as in Example 1. After recrystallisation from a mixture of methanol/ether, the one diastereomeric d,l-cis(diequat.)-6-(3,4-methylenedioxyphenyl)-2-morpholine lactamide hydrochloride melts at 251–253° with decomposition (see Example 8).

The starting material used in this example is produced as follows:

(a) 110 ml. of freshly distilled benzaldehyde are added to a solution of 168.0 g. of α-aminomethyl-3,4-methylenedioxy-benzyl alcohol in 1400 ml. of benzene and the whole is refluxed while separating off water. After about 5 hours, the theoretical amount of water has been removed. The solution is then concentrated to about 500 ml. and cooled whereupon the crystalline product precipitates. After recrystallisation from hot benzene, the 3,4-methylenedioxy-α-(benzylideneaminomethyl) - benzyl alcohol melts at 121–128°.

(b) 65.0 g. of 3,4-methylenedioxy-α-(benzylideneaminomethyl)-benzyl alcohol are slurried in 500 ml. of isopropanol and, while stirring at room temperature, a solution of 55.0 g. of sodium borohydride in 450 ml. of ice cold methanol is added dropwise within 20 minutes whereup on the reaction mixture is refluxed for 5 hours. The clear solution is then worked up as in Example (b). After evaporating off the solvent, the mixture which remains (21.0 g.) is separated by chromatographing on 30 times the amount of silica gel using a mixture of benzene/chloroform/ethyl acetate (6:6:2.5) as eluent. The d,l-cis(diequat.) - 4 - benzyl-6-(3,4-methylenedioxyphenyl)-2-morpholine acetaldehyde is oily.

(f) 12.0 g. of d,l-cis(diequat.)-4-benzyl-6-(3,4-methylenedioxyphenyl)-2-morpholine acetaldehyde are dissolved in a mixture of 100 ml. of glacial acetic acid, 50 ml. of ethanol and 50 ml. of water. While stirring and cooling with an ice bath, 13.0 g. of solid potassium cyanide are added in portions within 15 minutes and then the solution is refluxed for 1 hour. The reaction mixture is then worked up as in Example 2(d). After evaporating off the solvent in vacuo at 40–45°, the oily mixture of the two diastereomeric d,l-cis(diequat.)-4-benzyl-6-(3,4-methylenedioxyphenyl)-2-morpholine acetaldehyde cyanohydrins remains.

(g) The above mixture of cyanohydrins (11.0 g.) is dissolved in 65 ml. of chloroform, 14.5 ml. of a solution of hydrogen chloride in chloroform/ethanol (as in Example 2(e)) are added and the solution is left to stand for 3 days at 0° in a closed flask under an atmosphere of nitrogen. Then the reaction mixture is worked up as in Example 2(e). After evaporating off the solvent, the oil which remains (11.5 g.) is separated by chromatographing twice on 50 times and 90 times the amount of silica gel using a mixture of ether/benzene (3:1) as eluent. Both diastereomeric d,l-cis(diequat.)-4-benzyl-6-(3,4-methylenedioxyphenyl) - 2 - morpholine lactic acid ethyl esters are oily. They are distinguished by thin layer chromatography on silica gel using ether as eluent, and referred to as the "upper" and the "lower" product, respectively.

(h) 2.70 g. of one of the diastereomeric d,l-cis(diequat.)-4-benzyl-6-(3,4-methylenedioxyphenyl) - 2 - morpholine lactic acid ethyl esters (the "upper" product in thin layer chromatograms) are dissolved in 20 ml. of 96% ethanol, 50 ml. of ethanolic ammonia (15% ammonia in ethanol) and 50 ml. of concentrated aqueous ammonium hydroxide solution are added and the clear solution is left to stand in a closed flask at room temperature. After 48 hours, another 10 ml. of concentrated aqueous ammonium hydroxide solution are added to the reaction mixture. After having stood for, in all, from 4 to 5 days, the solution is evaporated to dryness in vacuo at 50° and the amide which remains is purified by chromatographing on 20 times the amount of silica gel using a mixture of benzene/methanol (4:1) as eluent. After recrystallisation from a mixture of benzene/ether/petroleum ether, the diastereomeric d,l-cis(diequat.-4-benzyl - 6 - (3,4 - methylenedioxyphenyl)-2-morpholine lactamide melts at 198–200° with decomposition (cf. Example 8).

EXAMPLE 8

A solution (0.30 g.) of the d,l-cis(diequat.)-4-benzyl-6-(3,4-methylenedioxyphenyl) - 2 - morpholine lactamide hydrate, M.P. 85–89°, in 40 ml. of 96% ethanol is shaken at room temperature under an atmosphere of hydrogen with 0.250 g. of 10% palladium charcoal and 0.60 ml. of ethanolic hydrogen chloride solution (as in Example 3). After about 5 hours, no more hydrogen is taken up. The reaction mixture is then worked up as in Example 1. After recrystallisation from a mixture of ethanol/ether, the second diastereomeric d,l-cis(diequat.)-6-(3,4 - methylenedioxyphenyl)-2-morpholine lactamide hydrochloride melts at 228–232° with decomposition (cf. Example 7).

The starting material used in this example is produced as follows:

(a) 0.850 g. of the second diastereomeric d,l-cis-(diequat.)-4-benzyl - 6 - (3,4 - methylenedioxyphenyl)-2-morpholine lactic acid ethyl ester (the "lower" product in thin layer chromatograms) (separated in Example 7(g)) is dissolved in 7 ml. of 96% ethanol. 25 ml. of ethanolic ammonia (15% ammonia in ethanol) and 25 ml. of concentrated aqueous ammonium hydroxide solution are added and the clear solution is left to stand in a closed flask at room temperature. After 24 hours, another 10 ml. of concentrated aqueous ammonium hydroxide solution are added to the reaction mixture. After standing for, in all, 6 days, the solution is evaporated to dryness in vacuo at 50° and the amide which remains is purified by chromatographing on 10 times the amount of silica gel using a mixture of benzene/ethanol (9:1) as eluent. After recrystallising from a mixture of ethanol/ether/petroleum ether, the second diastereomeric d,l-cis-(diequat.) - 4 - benzyl - 6 - (3,4-methylenedioxyphenyl)-

2-morpholine lactamide hydrate melts at 85–89° (cf. Example 7(h)).

EXAMPLE 9

A solution of 0.408 g. of d,l-cis(diequat.)-α-acetoxy-4-benzyl-6-(3,4 - methylenedioxyphenyl) - 2 - morpholine propionamide in 40 ml. of 96% ethanol is shaken at room temperature under a hydrogen atmosphere with 0.80 g. of 10% palladium charcoal and 0.27 ml. of ethanolic hydrogen chloride solution (as in Example 3). After about 1 hour, no more hydrogen is taken up. The reaction mixture is then worked up as in Example 1. After evaporating off the solvent, the mixture which remains is separated by chromatographing on 50 times the amount of silica gel using 96% ethanol as eluent. After recrystallisation from a mixture of ethanol/ether (1:1), the d,l-cis(diequat.)-α-acetoxy-6-(3,4-methylenedioxyphenyl) - 2-morpholine propionamide hydrochloride melts at 194–200° with decomposition.

The starting material used in this example is produced as follows:

0.70 g. of d,l-cis(diequat.)-4-benzyl-6-(3,4-methylenedioxyphenyl)-2-morpholine lactamide, M.P. 198–200°, (prepared as in Example 7(h)) are dissolved in 15 ml. of pyridine. 10 ml. of acetic acid anhydride are then added and the whole is left to stand in a closed flask for 18 hours at room temperature. The reaction mixture is then evaporated to dryness in vacuo at 70° and the oil which remains is separated on 100 times the amount of silica gel using a mixture of benzene/ethanol (9:1) as eluent. After recrystallisation from a mixture of isopropanol/n-hexane (1:1), the d,l-cis(diequat.)-α-acetoxy-4-benzyl-6 - (3,4 - methylenedioxyphenyl)-2-morpholine propionamide melts at 90–93°.

EXAMPLE 10

(ii) A solution (1.43 g.) of the foam-like d,l-cis-(diequat.) - 4 - benzyl - 6 - (2,3 - dibenzyloxyphenyl)-2-morpholine lactamide in 40 ml. of 96% ethanol is shaken at room temperature under an atmosphere of hydrogen with 1.50 g. of 10% palladium charcoal and 2.50 ml. of ethanolic hydrogen chloride solution (as in Example 3). After about 11 hours, no more hydrogen is taken up. The reaction mixture is then worked up analogously to Example 2. After recrystallisation from a mixture of methanol/ethanol/isopropanol/ether, a diastereomeric d,l-cis(diequat.) - 6-(2,3-dihydroxyphenyl)-2-morpholine lactamide hydrochloride is obtained which melts at 216–220° (with decomposition).

The starting material used in this example is produced as follows:

(a) A solution of 64.0 g. of 2,3-dibenzyloxy mandelonitrile (prepared by boiling 2,3-dibenzyloxy benzaldehyde with potassium cyanide in a mixture of glacial acetic acid/ethanol/water) in 400 ml. of anhydrous ether is added dropwise to a suspension of 35.0 g. of lithium aluminium hydride in 1500 ml. of anhydrous ether, the addition being so made that the temperature never exceeds 5°. The reaction mixture is then stirred for 14 hours at room temperature. The slurry is then cooled with an ice bath and, while stirring vigorously, 35 ml. of water, 35 ml. of 2 N sodium hydroxide solution and 100 ml. of water are added dropwise (the additions being made within 1 hour) after which the whole is stirred for 1 hour at room temperature. The reaction mixture is then filtered under suction, the filter residue is boiled twice with 500 ml. of benzene each time and again the mixture is filtered under suction. The combined organic phases are dried over sodium sulphate and the solvent is evaporated off in vacuo at 50°. After recrystallising the product from benzene/ether, the α-aminomethyl-2,3-dibenzyloxy-benzyl alcohol melts at 102–104°.

(b) 125 ml. of freshly distilled benzaldehyde are added to a solution of 230.0 g. of α-aminomethyl-2,3-dibenzyloxybenzyl alcohol in 1000 ml. of benzene and the whole is refluxed while separating off water. After about 2 hours, the theoretical amount of water has been removed. The solution is then evaporated in vacuo at 50° and the oil which remains is well mixed with about 200 ml. of petroleum ether. The petroleum ether is then decanted and the product which remains is recrystallised from benzene/n-hexane. The 2,3 - dibenzyloxy-α-(benzylideneaminomethyl)-benzyl alcohol melts at 103–105°.

(c) 42.0 g. of 2,3-dibenzyloxy-α-(benzylideneaminomethyl)-benzyl alcohol are slurried in 350 ml. of isopropanol. While stirring at room temperature, a solution of 38.0 g. of sodium borohydride in 350 ml. of ice cold methanol is added dropwise within 30 minutes and then the reaction mixture is refluxed for 3 hours whereupon the substance dissolves. The reaction mixture is then worked up as in Example 1(b). After recrystallisation from benzene/n-hexane, the 2,3-dibenzyloxy-α-(benzylaminomethyl)-benzyl alcohol melts at 106–108°.

(d) 25.0 g. of 2,3 - dibenzyloxy-α-(benzylaminomethyl)-benzyl alcohol and 12.0 g. of 1,1-diethoxy-3,4-epoxy butane in 250 ml. of anhydrous ethanol are refluxed for 14 hours under a nitrogen atmosphere. After evaporating off the ethanol in vacuo at 50°, the oily 4-[N-benzyl-N - (2,3 - dibenzyloxy-β-hydroxyphenethyl)-amino]-3-hydroxy-butyraldehyde diethyl acetal remains.

(e) The above acetal (35.0 g.) is dissolved in 200 ml. of anhydrous ethanol, then a solution of 23.0 g. of p-toluene sulphonic acid hydrate in 120 ml. of anhydrous ethanol is added and the whole is refluxed for 14 hours under an atmosphere of nitrogen. The reaction mixture is then worked up as in Example 1(d). After evaporating off the solvent, the oil which remains is separated by chromatographing twice on 25 times the amount of silica gel each time using a mixture of benzene/chloroform/ethyl acetate (6:6:2.5) as eluent. The d,l-cis(diequat.)-4-benzyl-6-(2,3-dibenzyloxyphenyl)-2-morpholine acetaldehyde diethyl acetal is oily.

(f) 20.0 g. of d,l-cis(diequat.)-4-benzyl-6-(2,3-dibenzyloxyphenyl)-2-morpholine acetaldehyde diethyl acetal are dissolved in 150 ml. of n-butanol. A solution of 7.50 ml. of concentrated sulphuric acid in 150 ml. of water is then added (as in Example 2(c)) and the reaction mixture is refluxed for 10 minutes under an atmosphere of nitrogen. The solution is then worked up analogously to Example 2(c). After evaporating off the solvent, the oil which remains is separated by chromatographing on 35 times the amount of silica gel using a mixture of benzene/chloroform/ethyl acetate (6:6:2.5) as eluent. The d,l-cis(diequat.) - 4 - benzyl - 6 - (2,3-dibenzyloxyphenyl)-2-morpholine acetaldehyde is oily.

(g) The oily mixture of the two diastereomeric d,l-cis(diequat.) - 4 - benzyl - 6 - (2,3-dibenzyloxyphenyl)-2-morpholine acetaldehyde cyanohydrins is obtained analogously to Example 2(d) from the d,l-cis(diequat.)-4-benzyl - 6 - (2,3 - dibenzyloxyphenyl)-2-morpholine acetaldehyde.

(h) A mixture of the two diastereomeric d,l-cis-(diequat.) - 4 - benzyl - 6 - (2,3-dibenzyloxyphenyl)-2-morpholine acetaldehyde cyanohydrins (50.0 g.) is dissolved in 250 ml. of chloroform. 55.0 ml. of a solution of hydrogen chloride in chloroform/ethanol (as in Example 2(e)) is added and the clear solution is left to stand in a closed flask for 3 days at 0° under an atmosphere of nitrogen. The solvent is then evaporated off in vacuo at 40–50°, the oil which remains is taken up in a mixture of 150 ml. of ethanol and 75 ml. of water, the clear solution is kept on a water bath at 50° for 20 minutes and then worked up analogously to Example 2(e). After evaporating off the solvent, the oil which remains is separated by chromatographing twice on 30 times the amount of silica gel each time using a mixture of benzene/ether (3:1) as eluent. One of the two diastereomeric d,l-cis-(diequat.) - 4 - benzyl - 6 - (2,3-dibenzyloxyphenyl)-2-morpholine lactic acid ethyl esters is an oil. The other diastereomer melts at 120–122° after recrystallisation from methylene chloride/ether. The two diastereomers can be identified by their NMR spectrum.

(i) 2.8 g. of d,l-cis(diequat.)-4-benzyl-6-(2,3-dibenzyl-oxyphenyl) - 2 - morpholine lactic acid ethyl ester, M.P. 120–122°, are dissolved in 10 ml. of benzene, then 40 ml. of ethanolic ammonia (15% ammonia in ethanol) and 20 ml. of concentrated aqueous ammonium hydroxide solution are added and the clear solution is left to stand in a closed flask at room temperature. After 24 hours, another 12 ml. of concentrated aqueous ammonium hydroxide solution are added to the reaction mixture. After standing for, in all, 3 days, the solution is evaporated to dryness in vacuo at 50° and the product is purified by chromatographing on 20 times the amount of silica gel using a mixture of benzene/chloroform/ethanol (5:5:0.3) as eluent. The resulting diastereomeric d,l-cis(diequat.)-4 - benzyl - 6 - (2,3 - dibenzyloxyphenyl)-2-morpholine lactamide is foam-like.

EXAMPLE 11

The oily diastereomer ester obtained by chromatography in step (h) of Example 10 is further processed as described in step (i) and final step (ii) of the same example, and the other diastereomeric d,l-cis(diequat.)-6-(2,3-dihydroxyphenyl)-2-morpholine lactamide hydrochloride is obtained as a yellowish oil, via the diastereomeric d,l-cis(diequat.) - 4 - benzyl - 6-(2,3-dibenzyloxy-phenyl)-2-morpholine lactamide of the melting point 118–119°.

EXAMPLE 12

Example 1 is repeated, but in lieu of methylamine used as reactant in step (e), there are employed 30 ml. of n-butylamine, and instead of leaving the resulting mixture stand at room temperature, the reaction mixure of step (e) is boiled for 48 hours under reflux. Otherwise the procedure of the step is followed, but the reaction product was chromatographed on a column containing 45 times the amount of silica gel, with a benzene/ethanol (97:3) mixture as eluent.

The resulting d,l-cis(diequat.)-N-(n-butyl)-4-benzyl-6-(3,4-dibenzyloxy-phenyl) - 2 - morpholine propionamide (melting point 95–98°) is then converted in accordance with final step (i) of Example 1 to d,l-cis(diequat.)-N-(n-butyl)-6-(3,4-dihydroxyphenyl)-2 - morpholine propionamide hydrochloride as a yellowish oil.

EXAMPLE 13

(a) The d,l-cis(diequat.)-4-benzyl-6-(3,4-dibenzyloxy-phenyl)-2-morpholine lactamide diastereomer of melting point 129–130°, obtained as described in step (f) of Example 2 is converted into d,l-cis(diequat.)-α-acetoxy-4-benzyl-6-(3,4-dibenzlyoxy-phenyl) - 2 - morpholine propionamide by reacting the former with acetic anhydride in pyridine solution, leaving the mixture stand at room temperature for 16 hours.

(b) The mixture is then evaporated to dryness by heating at 60° in vacuo, the oily residue was extracted with chloroform and the extract was washed with aqueous 2-normal sodium carbonate solution and then with water. Chloroform was then evaporated, whereby the dry product crystallises (melting point 115–117°).

(c) The latter product is converted into d,l-cis(diequat.) - α - acetoxy-6-(3,4-dihydroxy-phenyl)-2-morpholine propionamide hydrochloride in accordance with the procedure of final step (i) of Example 2, the product being a hygroscopic solidified foam.

EXAMPLE 14

The d,l-cis(diequat.)-N-methyl-4-benzyl-6-(3,4-dibenzyloxy-phenyl)-2-morpholine alanine amide diastereomer of melting point 123–124°, obtained as described in step (c) of Example 5 is converted into d,l-cis(diequat.)-N-methyl - α - acetamido-4-benzyl-6-(3,4-dibenzyloxy-phenyl)-2-morpholine propionamide by reacting the former with acetic anhydride in pyridine solution, leaving the mixture stand for 16 hours at room temperature.

The product was further processed as described in step (b) of Example 13. The crystalline product is then chromatographed on 40 times its amount of silica gel with benzene/ethanol (9:1) mixture as eluent. The melting point of the purified product is 160–162°.

The latter product is converted into d,l-cis(diequat.)-N-methyl - α - acetamido-6-(3,4-dihydroxy-phenyl)-2-morpholine propionamide hydrochloride in accordance with step (i) of Example 5, the product being a hygroscopic solidified foam.

EXAMPLE 15

(a) 8.5 g. of ethyl d,l-cis(diequat.)-4-benzyl-6-(3,4-dibenzyloxy-phenyl)-2-morpholine propionate obtained as described under step (d) in Example 1 are added to 42.5 ml. of a 10%-solution of potassium hydroxide in a mixture of ethanol/water (9:1) and the mixture is boiled for 14 hours under reflux.

(b) The resulting mixture is then evaporated to dryness under vacuo at 50° and the foaming residue is dissolved in a mixture of 60 ml. of water and 100 ml. of chloroform. The aqueous phase is separated from the chloroform phase and is acidified with concentrated hydrochloric acid to pH 3. It is then extracted with chloroform, and the resulting chloroform extract is washed with 20 ml. of aqueous saturated sodium chloride solution, then dried over sodium sulphate, and finally evaporated to dryness.

(c) The resulting foamy d,l-cis(diequat.)-4-benzyl-6-(3,4-dibenzyloxy-phenyl)-2-morpholine propionic acid hydrochloride is then disolved in 20 ml. of chloroform, 25 ml. of oxalyl chloride are added to the solution and the mixture is then left standing for 24 hours at room temperature in a closed vessel.

(d) The mixture is then concentrated to dryness in vacuo at 40°, and the resulting d,l-cis(diequat.)-4-benzyl-6-(3,4-dibenzyloxy-phenyl)-2-morpholine propionyl chloride hydrochloride is dissolved in 20 ml. of chloroform, and a solution of 20 ml. of morpholine in 50 ml. of chloroform is added dropwise thereto during one hour, with stirring and simultaneous cooling in an ice bath. Stirring of the mixture is continued for 14 hours at room temperature. The reaction mixture is then diluted by adding 200 ml. of chloroform, then washed three times with water, and then dried over sodium sulphate and evaporated to dryness in vacuo at 50°.

The oily residue is chromatographed on 70 times its amount of silica gel with benzene/chloroform/ethanol (5:5:0.3) as eluent. The resulting d,l-cis(diequat.)-4-benzyl-6-(3,4-dibenzyloxy-phenyl)-2-morpholine propionmorpholide has a melting point of 118–120°.

(e) The latter compound is converted to d,l-cis(diequat)-6-(3,4-dihydroxy-phenyl) - 2 - morpholine propionomorpholide hydrochloride by the procedure given as final step (i) in Example 1, the product being a hygroscopic solidified foam.

EXAMPLE 16

By reacting 5 g. of d,l-cis(diequat.)-4-benzyl-6-(3,4-dibenzyloxy-phenyl)-2-morpholine propionyl chloride hydrochloride obtained as product of step (c) of Example 15, with 50 ml. ethanolic ammonia (as used in step (f) of Example 2) in lieu of morpholine, and otherwise proceeding in accordance with the procedure of step (d) in Example 15, but chromatographing on 80 times the product amount of silica gel with benzene/ethanol (93:7) as eluent, there is obtained d,l-cis(diequat.)-4-benzyl-6-(3,4-dibenzyloxy-phenyl) - 2 - morpholine propionamide (melting point 127–130°).

In In an analogous manner, but using in lieu of ethanolic ammonia 20 ml. of diethylamine dissolved in 50 ml. of chloroform, and chromatographing the reaction product in 70 times its amount of silica gel with benzene/chloroform/ethanol (5:5:0.5) as eluent, there is obtained d,l-cis(diequat.)-N,N-diethyl-4-benzyl-6-(3,4-dibenzyloxyphenyl)-2-morpholine propionamide.

By using the procedure given in final step (i) of Example 1, the two above intermediate products are converted, respectively, to (a) d,l-cis(diequat.)-6-(3,4-dihydroxy-phenyl)-2-morpholine propionamide, and
(b) d,l-cis(diequat.) - N,N - diethyl-6-(3,4-dihydroxyphenyl)-2-morpholine propionamide.

EXAMPLE 17

A solution of 1.0 g. of d,l-cis(diequat.)-4-benzyl-6-(3,4-dibenzyloxyphenyl)-2-morpholine propionamide in 50 ml. of 96% ethanol is shaken at room temperature under an atmosphere of hydrogen with 0.80 g. of 10% palladium charcoal and 1.0 ml. of ethanolic hydrogen chloride solution (containing 19.5% hydrogen chloride in 96% ethanol). The hydrogen up-take ceases after about 14 hours. The catalyst is then filtered off and washed with ethanol. After evaporation of the filtrate in vacuo at 40–50°, the d,l-cis(diequat.)-6-(3,4-dihydroxyphenyl) - 2-morpholine propionamide hydrochloride remains as a solid hygroscopic foam.

The starting material used in this example is produced as follows:

100 ml. of liquid ammonia are added to a solution of 3.0 g. of d,l-cis(diequat.)-4-benzyl-6-(3,4-dibenzyloxyphenyl)-2-morpholine ethyl propionate (cf. Example 1d) in 500 ml. of methanol and the reaction mixture is heated for 24 hours in an autoclave at 100°. The dark red solution is then cooled, evaporated in vacuo to dryness at 50° and the solid product which remains is purified chromatographically on 50 times the amount of silica gel using a mixture of benzene/ethanol (16:1) as eluent. After recrystallisation from methylene chloride/ether, the d,l-cis(diequat.)-4-benzyl - 6 - (3,4-dibenzyloxyphenyl)-2-morpholine propionamide melts at 130–132°.

EXAMPLE 18

A solution of 1.0 g. of d,l-cis(diequat.)-7-acetoxy-4-benzyl-6-(3,4-dibenzyloxyphenyl) - 2-morpholine propionamide in 50 ml. of 96% ethanol is shaken at room temperature under an atmosphere of hydrogen with 0.80 g. of 10% palladium charcoal and 0.50 ml. of ethanolic hydrogen chloride solution (containing 19.5% hydrogen chloride in 96% ethanol). The hydrogen up-take ceases after about 20 hours. The catalyst is then filtered off and washed with ethanol. After evaporation of the filtrate in vacuo at 40°, the diasteromeric d,l-cis(diequat.)-α-acetoxy-6-(3,4-dihydroxyphenyl)-2-morpholine propionamide hydrochloride remains as a hydroscopic solidified foam.

The starting material used in this example is produced as follows:

(a) 10.0 g. of d,l-cis(diequat.)-4-benzyl-6-(3,4-dibenzyloxyphenyl)-2-morpholine lactamide, M.P. 161–163° (cf. Example 3) (second paragraph) are dissolved in 50 ml. of pyridine. 50 ml. of acetic acid anhydride are added and the whole is left to stand in a closed flask for 18 hours at room temperature. The solution is then concentrated in vacuo at 50°, the oil which remains is taken up in chloroform and the solution is washed with 2 N sodium carbonate solution and water. The chloroform phase is dried over sodium sulphate, the chloroform is evaporated in vacuo at 40° and the reaction product is purified chromatographically on 10 times the amount of silica gel using a mixture of benzene/ethanol (20:1) as eluent. After recrystallisation from methylene chloride/ether, the diastereomeric d,l-cis(diequat.)-α-acetoxy-4-benzyl-6-(3,4-dibenzyloxyphenyl)-2-morpholine propionamide melts at 85–90°.

EXAMPLE 19

A solution of 1.0 g. of d,l-cis(diequat.)-α-acetoxy-4-benzyl-6-(3,4-dibenzyloxyphenyl)-2-morpholine propionamide, M.P. 85–90°, (cf. Example 18a) in 50 ml. of glacial acetic acid, is shaken at room temperature under an atmosphere of hydrogen with 0.80 g. of 5% palladium charcoal. The hydrogen up-take ceases after about 6 hours. The catalyst is then filtered off and washed with glacial acetic acid. After evaporation of the filtrate in vacuo at 50°, the d,l-cis(diequat.)-α-acetoxy - 6 - (3,4-dihydroxyphenyl)-2-morpholine propionamide acetate remains as a hygroscopic solidified foam.

EXAMPLE 20

A solution of 1.0 g. of d,l-cis(diequat.)-α-acetoxy-4-benzyl - 6 - (3,4 - dibenzyloxyphenyl)-2-morpholine propionamide, M.P. 85–90° (cf. Example 18(a)) in 45 ml. of 96% ethanol is shaken at room temperature under an atmosphere of hydrogen with 0.80 g. of 10% palladium charcoal and 3.40 ml. of ethanolic methane sulphonic acid solution (9.70 g. methane sulphonic acid in 100 ml. of 96% ethanol). The hydrogen up-take ceases after about 6 hours. The catalyst is then filtered off and washed with ethanol. After evaporation of the filtrate in vacuo at 45°, the d,l-cis(diequat.)-α-acetoxy-6-(3,4-dihydroxyphenyl)-2-morpholine propionamide methane sulphonate remains as a hygroscopic solidified foam.

EXAMPLE 21

A solution of 0.80 g. of d,l-cis(diequat.)-N-methyl-α-acetamido - 4 - benzyl - 6 - (3,4-dibenzyloxyphenyl)-2-morpholine propionamide, M.P. 163–164°, in 50 ml. of 96% ethanol is shaken at room temperature under an atmosphere of hydrogen with 0.80 g. of 10% palladium charcoal and 2.0 ml. of ethanolic hydrogen chloride solution (containing 19.5% hydrogen chloride in 96% ethanol). The hydrogen up-take ceases after about 5 hours. The catalyst is then filtered off and washed with ethanol. After concentrating the filtrate in vacuo at 45°, the diastereomeric d,l - cis(diequat.) - N - methyl - α-acetamido - 6 - (3,4 - dihydroxyphenyl)-2-morpholine propionamide hydrochloride remains as a hygroscopic solidified foam.

The starting material used in this example is produced as follows:

(a) 0.95 g. of d,l-cis(diequat.)-N-methyl-4-benzyl-6-3,4-dibenzyloxyphenyl)-2-morpholine alaninamide, M.P. 118–123° (cf. Example 6(a)) are dissolved in 10 ml. of pyridine, 10 ml. of acetic acid anhydride are added and the whole is left to stand in a closed flask for 18 hours at room temperature. The reaction product is then worked up as described in Example 18(a) and the product is purified chromatographically on 25 times the amount of silica gel using a mixture of benzene/ethanol (9:1) as eluent. After recrystallisation from ethanol, the diastereomeric d,l - cis(diequat.) - N - methyl-α-acetamido-4-benzyl-6-(3,4 - dibenzyloxyphenyl) - 2-morpholine propionamide melts at 163–164°.

EXAMPLE 22

(a) 1.0 g. of the oily diastereomeric d,l-cis(diequat.)-6-(3,4-methylenedioxyphenyl)-2-morpholine lactic acid ethyl ester hydrochloride are dissolved in 25 ml. of ethanolic methylamine solution (33% methylamine in anhydrous ethanol) and the clear solution is left to stand for two days in a closed flask at room temperature. The reaction mixture is then evaporated to dryness in vacuo at 50° and the product which remains is purified by chromatography on 50 times the amount of silica gel using ethanol as eluent. After recrystallisation from a mixture of benzene/ether, the d,l-cis(diequat.)-N-methyl-6-(3,4-methylenedioxyphenyl)-2-morpholine lactamide melts at 139–140°.

The above obtained free base is dissolved in 5 ml. of ethanol. Ethereal hydrogen chloride is added until the reaction is acid whereupon the whole is left to stand for 1 hour at room temperature. The solution is then evaporated to dryness at 40° in vacuo. The oil which remains solidifies after cooling and mixing with a mixture of ethanol/ isopropanol/ether. After recrystallisation from a mixture of ethanol/ether, the d,l-cis(diequat.)-N-methyl-6-(3,4-methylenedioxyphenyl) - 2 - morpholine lactamide hydrochloride melts at 202–208° with decomposition.

The starting material used in this example is produced as follows:

(b) A solution of 6.16 g. of the one oily diastereomeric d,l - cis(diequat.) - 4 - benzyl - 6 - (3,4-methylenedioxyphenyl)-2-morpholine lactic acid ethyl ester (cf. Example 7(g)), "upper" product in thin layer chromatogram in 300 ml. of ethanol (96%) is shaken at room temperature under an atmosphere of hydrogen with 5.0 g. of 10% palladium charcoal and 6.5 ml. of ethanolic hydrogen chloride solution (containing 19.5% hydrogen chloride in ethanol). No more hydrogen is taken up after about 14 hours. The reaction mixture is then worked up as in Example 1(i). The diastereomeric d,l-cis(diequat.)-6-(3,4-methylenedioxyphenyl)-2-morpholine lactic acid ethyl ester hydrochloride is oily.

EXAMPLE 23

A solution of 1.0 g. of the oily diastereomeric d,l-cis(diequat.)-6-(3,4-methylenedioxyphenyl)-2-morpholine lactic acid ethyl ester hydrochloride (same product described as in Example 22(b)) in 25 ml. of n-butylamine is refluxed for 18 hours. The reaction mixture is then evaporated to dryness at 50° in vacuo and the product which remains is purified by chromatography on 50 times the amount of silica gel using ethanol as eluent. After recrystallisation from a mixture of benzene/ether, the d,l-cis(diequat.) - N - n-butyl-6-(3,4-methylenedioxyphenyl)-2-morpholine lactamide melts at 134–136°.

The d,l-cis(diequat.)-N-n-butyl-6-(3,4-methylenedioxyphenyl)-2-morpholine lactamide hydrochloride (produced in analogy to Example 22a) melts at 208–214° with decomposition (recrystallised from a mixture of ethanol/ether).

EXAMPLE 24

(a) A solution of 0.80 g. of the diastereomeric d,l-cis (diequat.) - 6 - (3,4-methylenedioxyphenyl)-2-morpholine lactic acid ethyl ester hydrochloride, M.P. 186–190° (with decomposition), in 25 ml. of isopropylamine is refluxed for 6 days. The reaction mixture is then evaporated to dryness in vacuo at 40° and the product which remains is purified by chromatography on 125 times the amount of silica gel using ethanol as eluent. The d,l-cis(diequat.)-N - isopropyl - 6 - (3,4 - methylenedioxyphenyl) - 2-morpholine lactamide hydrochloride (obtained from the free base as in Example 2(a)) melts at 197–204° with decomposition (recrystallised from a mixture of ethanol/ether).

The starting material used in this example is produced as follows:

(b) A solution of 2.74 g. of the second oily diastereomeric d,l - cis(diequat.) - 4-benzyl-6-(3,4-methylenedioxyphenyl)-2-morpholine lactic acid ethyl ester (the "lower" product of Example 7(g)), lower product in thin layer chromatogram in 150 ml. of 96% ethanol is shaken at room temperature under an atmosphere of hydrogen with 2.0 g. of 10% palladium charcoal and 3 ml. of ethanolic hydrogen chloride solution (containing 19.5% hydrogen chloride in ethanol). After about 4 hours, the hydrogen take-up ceases. The catalyst is then filtered off, washed with ethanol, the ethanolic solution is concentrated to about 3 ml. in vacuo at 40° and ether is added until it becomes turbid. On standing in a refrigerator, the crystalline product precipitates. After recrystallisation from warm ethanol, the d,l - cis(diequat.) - 6-(3,4-methylenedioxyphenyl)-2-morpholine lactic acid ethyl ester hydrochloride melts at 186–190° with decomposition.

What is claimed is:
1. A cis-diequatorial compound of the formula

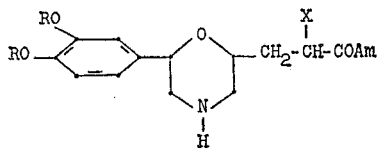

wherein
each R is hydrogen or both R's taken together are methylene;
X is hydrogen, hydroxyl, amino, acetoxy or acetamido; and
Am is amino, mono-lower alkylamino, di-lower alkylamino, said lower alkyl being of from one to four carbon atoms, or morpholino.

2. A compound according to claim 1 wherein each R is hydrogen, and Am is amino or mono-lower alkylamino.

3. A compound according to claim 2 wherein X is acetoxy.

4. A compound according to claim 2 wherein X is acetamido.

5. A compound according to claim 1, wherein each R is hydrogen, X is hydroxyl and Am is amino.

6. A compound according to claim 1, wherein each R is hydrogen, X is hydroxyl and Am is amino, which compound is a diastereomer, the hydrochloride of which has the melting point 208–210° C.

7. A compound according to claim 1, wherein each R is hydrogen, X is hydroxyl and Am is amino, which compound is a diastereomer, the hydrochloride of which has the melting point 142–146° C.

8. A compound according to claim 1, wherein each R is hydrogen, X is acetoxy and Am is amino or the hydrochloride thereof.

9. A compound according to claim 1, wherein each R is hydrogen, X is acetoxy and Am is amino or the hydrochloride thereof.

10. A compound according to claim 1, wherein each R is hydrogen, X is amino and Am is methylamino, which compound is a diastereomer, the dihydrochloride monohydrate of which has the melting point 193–198° C.

11. A compound according to claim 1, wherein each R is hydrogen, X is amino and Am is methylamino, which compound is a diastereomer, the dihydrochloride monohydrate of which has a melting point of 194–200° C.

12. A compound according to claim 1, wherein each R is hydrogen, X is acetamido and Am is methylamino or the hydrochloride thereof.

13. A compound according to claim 1, wherein R and X are hydrogen and Am is amino or the hydrochloride thereof.

14. A compound according to claim 1, wherein R and X are hydrogen and Am is morpholino or the hydrochloride thereof.

15. A compound according to claim 1, wherein both R's taken together are methylene, X is acetoxy and Am is amino, which compound is a diastereomer, the hydrochloride of which has a melting point of 194–200° C.

16. A pharmaceutically acceptable acid addition salt of a compound according to claim 1.

17. A compound according to claim 2 wherein X is hydrogen.

18. A compound according to claim 2 wherein X is hydroxy.

19. A compound according to claim 2 wherein X is amino.

No references cited.

ALEX MAZEL, Primary Examiner
J. TOVAR, Assistant Examiner

U.S. Cl. X.R.
260—247.2 A; 424—248